Inventor
JOHN P. HEISS

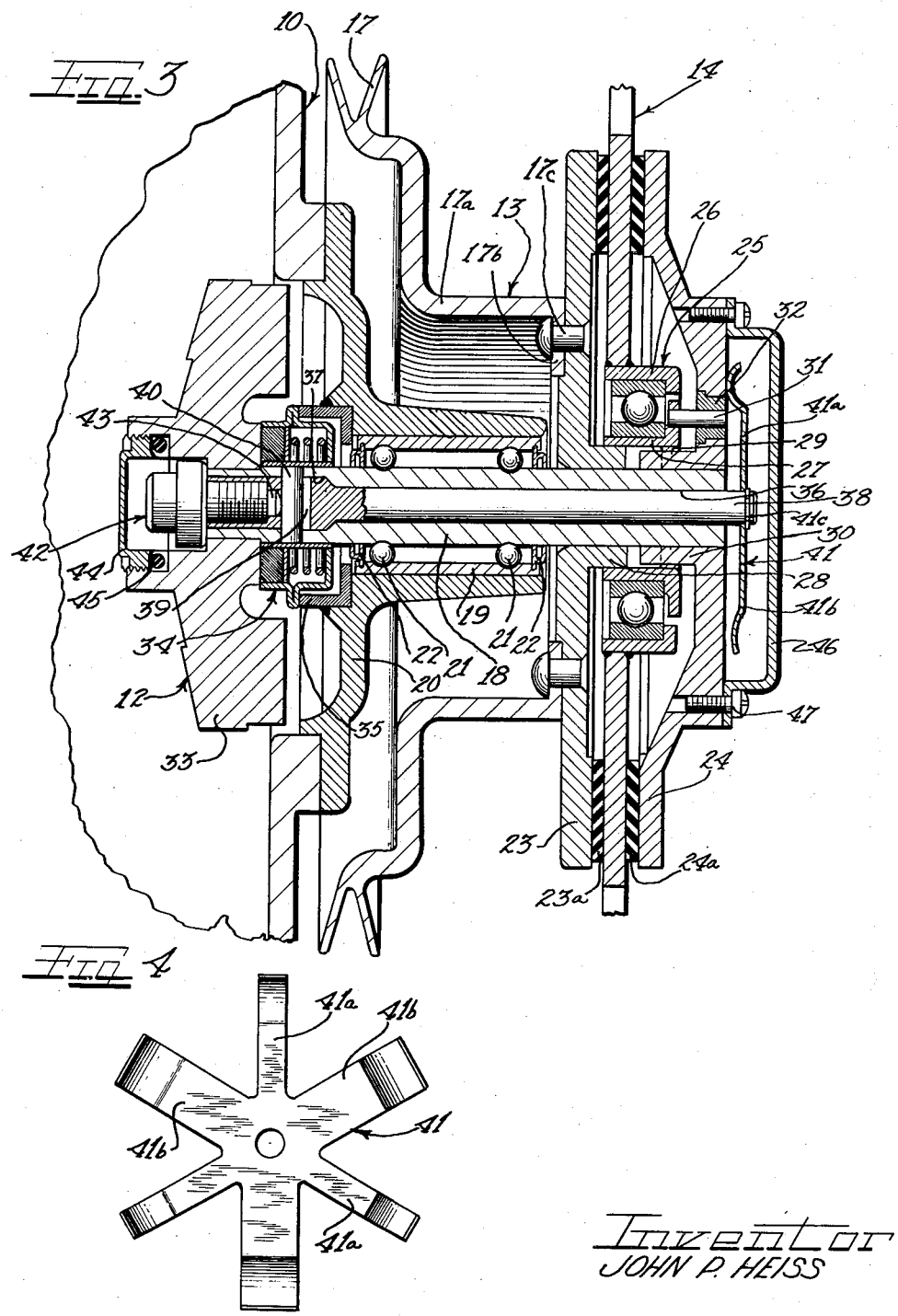

United States Patent Office 2,840,315
Patented June 24, 1958

2,840,315

THERMOSTATICALLY CONTROLLED FAN

John P. Heiss, Flint, Mich., assignor to Thompson Products, Inc., Cleveland, Ohio, a corporation of Ohio Application March 16, 1955, Serial No. 494,641

10 Claims. (Cl. 236—35)

The invention relates to improvements in fan drives, and more particularly to thermostatically controlled drives for cooling fans of internal combustion engines or the like, although the invention may have other uses and purposes as will be apparent to one skilled in the art.

In general, the invention deals with a variable speed fan drive for installation on an engine including, a clutch bearing pulley assembly supported on a hollow water pump shaft, a cooling fan normally rotatable on said pulley assembly at a slow speed due to partial actuation of the clutch assembly by a spring member, and a thermostatically controlled rod within said hollow shaft capable of fully actuating the clutch bearing pulley assembly through said spring member to completely engage or partially disengage it with the cooling fan according to the engine operating temperature.

Heretofore, numerous mechanisms have been developed to disconnect the drive to a cooling fan of an internal combustion engine when the engine temperature rises a predetermined amount. However, these devices included fan drives of highly complicated structure involving prohibitive manufacturing costs, poor efficiency, and high maintenance costs. For these reasons, the manufacturers of internal combustion engines refused to adapt the usage of fan drives, since it was obvious that the economy and operation of an internal combustion engine equipped with such a fan drive unit would be more than offset by the cost of the unit itself. Furthermore, the complete disconnection of a drive to a cooling fan of an internal combustion engine is not always desirable even when the engine is operating in a sufficiently cool condition to be efficient.

Accordingly, it is an object of this invention to obviate the above named difficulties and provide a fan drive unit of simple and economical construction which may be readily adapted for cooling usage on an internal combustion engine or other apparatus already equipped with a liquid cooling system.

It is a further object of this invention to provide a fan drive unit adapted to normally drive a cooling fan at a low speed, but capable of driving the cooling fan at a high speed when the temperature of an engine exceeds a predetermined amount.

Another object of this invention resides in the provision of a fan drive unit for internal combustion engines or the like capable of driving a fan at a high speed or a low speed depending upon the temperature of the coolant in an engine.

A further object of this invention is to provide a simple and positively acting thermostatically operated cooling fan driving unit for directly connecting a cooling fan to a drive means when the engine is a predetermined temperature to drive the fan at a high speed, while always maintaining the cooling fan at least partially connected to the drive means for driving the fan at a low speed.

Still another object of this invention resides in the provision of a variable speed fan drive for internal combustion engines or the like wherein a positively acting thermostat responsive to the temperature of an engine controls the speed of the fan drive, and wherein means is provided to compensate for overtravel of the thermostat caused by extreme overheating of the engine, thereby avoiding any possible damage to the fan drive unit.

Other objects, features and advantages of this invention will be apparent from the following detailed description of the annexed sheets of drawings, which by way of a preferred example only, illustrate the invention;

Figure 3 is an enlarged fragmentary view of an axial section, in elevation, taken substantially along a central vertical plane of the embodiment of Figure 2; and Figure 4 is an enlarged plan view of a detailed part of the fan drive unit of Figure 3 in accordance with the invention.

Figure 1:
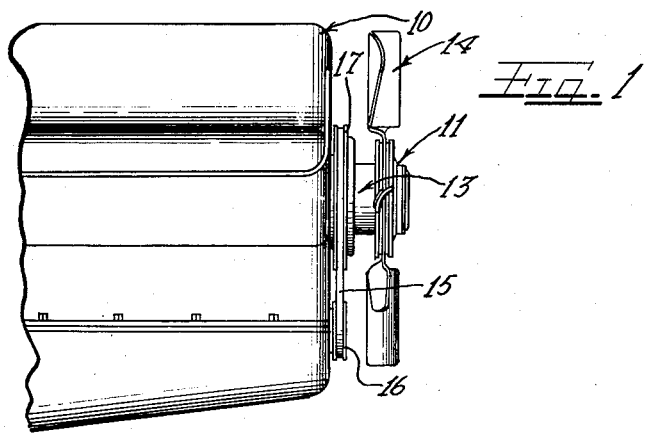
Figure 1 is a fragmentary side elevational view of an engine equipped with a fan drive unit embodying the present invention.
Figure 2:
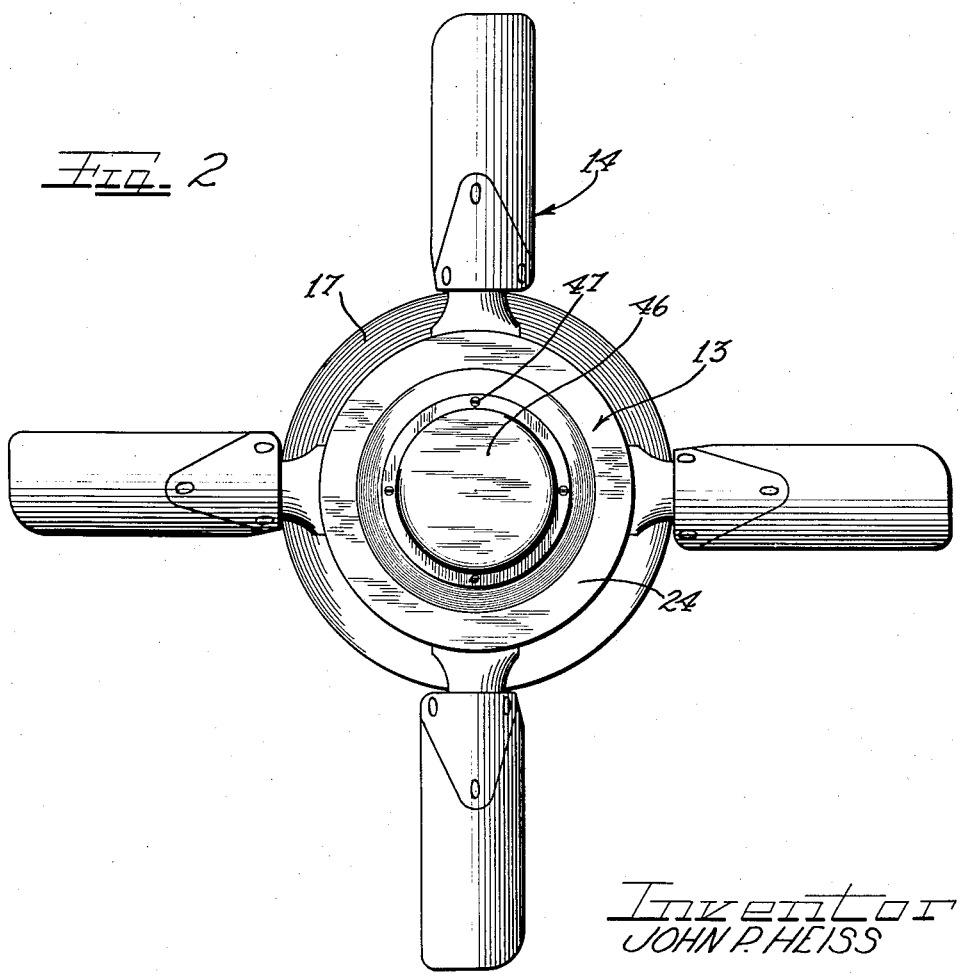
Figure 2 is an enlarged front elevational view of a fan drive unit according to the invention.

As shown in Figure 1, the fan drive unit of the present invention is illustrated as being installed on a fluid or water cooled internal combustion engine, indicated by the numeral 10. The fan drive unit, generally indicated by the numeral 11, comprises a water pump 12 (see Fig. 3), a pulley assembly 13, and a cooling fan 14. The cooling fan 14 is rotatably supported to draw air through a conventional radiator and over the engine to cool the engine, and may be driven by the pulley assembly 13, the latter being continuously driven by a belt 15 trained over a drive pulley 16 and a driven pulley 17 of the pulley assembly, said drive pulley being mounted on an extension of the engine crank shaft projecting from the front of the engine.

Referring to Figure 3, a main shaft 18 is rotatably supported by a bearing arrangement having an outer race 19 suitably secured in an apertured boss of a pump housing part 20, the latter being rigidly secured to and covering a pump opening in the engine 10.

In the bearing arrangement, a pair of annular series of balls 21, 21 directly separate the shaft 18 from the outer race 19, and ride in respective annular grooves of the shaft and outer race. Thus, it is seen that the shaft 18 functions as the inner race to the bearing arrangement. A pair of end oil sealing and retaining means 22, 22 close the gap between the shaft 18 and the outer race 19 adjacent the ends of the latter. This bearing assembly may be hermetically sealed and may be preferably an oil sealed bearing of the type well known in the art which does not require any lubrication attention.

On the outboard end of the main shaft 18, a variable speed clutching mechanism is mounted which includes, an outwardly facing disk-shaped clutch plate 23 suitably secured to the shaft, such as by keying or other means, against relative rotation and axial movement thereto, and a second inwardly facing disk-shaped clutch plate 24 axially slidable on the shaft 18. The clutch plates carry annular wear bands 23a and 24a of suitable friction material, and are bonded or otherwise suitably fastened to the respective clutch plates. Alternatively, the bands may be bonded to the opposite sides of the hub portion of fan 14.

The moving clutch plate 24 is locked to turn with the fixed clutch plate 23 by interlocking prongs. Alternatively the plate 23 may be splined or otherwise associated with shaft 18 so that it will rotate therewith.

The fan 14 is rotatably supported by a bearing arrangement 25, having an outer race 26 suitably secured, such as by welding in the instant case to the hub portion of fan 14, and an inner race 27 axially slidable and supported at its inner end by a hub portion functioning as a stub shaft 28 and an annular shoulder 29 on the inner race 27 slidably engaging an inwardly projecting hub portion 30 of the outer movable clutch plate 24. The inner race 27 is locked to the clutch plate 24 by means of a pin 31 secured to a flange portion of the inner race 27 and slidably received in an insert bushing 32 of the outer clutch plate 24.

The shaft 18 is driven through the clutch plate 23 by the belt pulley 17 which carries an offset hub portion 17a having an inwardly extending radial flange 17b suitably apertured to receive an annular series of securing elements, such as rivets 17c for rigidly securing the belt pulley to the clutch plate 23. Although not shown, the hub portion 17a of the belt pulley 17 might alternatively be integrally cast with the rear clutch plate 23. The offset hub 17a is hollowed to surround the apertured boss of the pump housing part 20.

Secured to the end of the shaft 18 opposite the clutch and within the pump housing is a conventional pump impeller 33, by means of suitable securing means such as a key. A water seal 34 surrounds the shaft 18 within the pump housing to prevent any coolant from escaping the housing and possibly damaging other parts of the drive unit, such as the bearing arrangement for the shaft 18. The seal 34 is ring shaped and is partially enclosed within a bushing 35, the latter being suitably secured, such as by welding to the pump housing part 20. A lateral flange extends outwardly from the seal casing and abuts against the inner end of the bushing 35. A resilient sealing ring, preferably made of rubber, is circumferentially enclosed within a cylindrical portion of the seal casing and its opposite vertical faces abut tightly against the hub portion of the impeller 33 and a shoulder of the metal annulus, thereby precluding the escape of fluid through the seal. And a spring is carried within the casing of the seal which constantly urges the shoulder of the seal against one face of the rubber ring in sealing engagement with the hub of the impeller 33 and the inner cylindrical portion of the sealed casing.

The shaft 18 is hollow and has an axial bore 36 extending from the forward end rearwardly to a larger bore 37 but of shorter length, the latter bore 37 continuing or terminating at the rear end of the shaft 18.

A cylindrical rod 38 is axially slidable within the bores 36 and 37 of the hollow shaft 18 and has sized diametral portions respectively received within the axial bores. In the region of the larger bore 37, the shaft 18 is transversely slotted as indicated by the numeral 39 to accommodate a pin member 40 secured at opposite diametral points of the shaft 18.

Carried at the outermost end of the rod 38 is a multi-fingered calibrated spring 41 centrally apertured for securement to the rod by suitable means such as a lock ring, nut, cotter pin arrangement or other suitable means, received on the end of the rod as indicated by numeral 41c. The spring 41, shown most clearly in Figures 3 and 4, carries six radial fingers, three of which are capable of exerting a small force by virtue of their size, as indicated by the numeral 41a, and may be defined as weak or light weight fingers. The weak fingers 41a carry outer engaging portions which continually contact the slidable clutch plate 24 to urge the clutch plates and fan into partial engagement at all times and effect a low speed fan drive.

The other three fingers indicated at 41b may be defined as strong or heavy weight fingers, and are alternately disposed with respect to the weak fingers 41a. The strong fingers 41b carry outer engaging portions which are generally in non-operating position, that is, as illustrated in Figure 3, the fingers do not contact the slidable clutch plate 24.

The enlarged portion of rod 38 carries a forwardly disposed annular shoulder abutting against an annular ridge formed by the enlarged bore 37 which limits the forward movement or protraction of the rod 38, thereby always maintaining the light fingers 41a of the calibrated spring 41 in engagement with an outer face of the clutch plate 24 to maintain a partial engagement of the clutching mechanism with the fan 14. However, due to the end engaging portions of the heavier fingers 41b, being in a different plane, as shown in Figure 3, these fingers are normally free from engaging the outer face of the clutch plate 24 and exerting any force thereon. The constant exertion of the light fingers 41a against the clutch plate 24 affects a low-speed drive by holding the clutch mechanism in a slip drive relation with the fan and maintaining fan speeds up to 1500 R. P. M.

When, however, the temperature of the coolant in the cooling system rises above a predetermined point, a thermostatic unit, generally designated by the numeral 42, which is threadedly carried within a hollowed portion of the enlarged end of the rod 38, responds and forces a plunger 43 against the pin 40 held by shaft 18 to axially retract the rod 38 inwardly. This retraction will cause the actuating ends of the heavy fingers 41b of spring 41 to engage the outer face of the clutch plate 24 and fully actuate the clutching means to effectively directly connect the fan 14 thereto and rotate the same at the speed of the belt pulley 17. Thus, a high speed fan drive is effected by the full actuation of the spring member 41 to aid in cooling of the engine and the water in a radiator. The spring member 41 is enclosed against the elements of the weather and dust or dirt by means of a cover 46 suitably secured to a raised portion of a clutch plate 24 by means of a plurality of cap screws 47.

The main casing of the thermostatic unit 42 moves axially within a recessed portion of the water pump impeller 33, which is sealingly enclosed by a cap or plug 44 and a resilient sealing ring 45 against the direct contact of the coolant in the cooling system.

The thermostatic unit 42, is commonly called a Vernatherm and is of the same general type as shown and described in the Vernet Patent No. 2,368,181, dated January 30, 1945, and is also commonly known as a "Vernay" thermostatic element. The particular utility of this type of thermostatic element is the positive action of the piston having far more power than any other thermostatic element and a relatively long piston travel, together with the compact overall size of the element in comparison with other known thermostatic units. Since the Vernatherm is such a positive acting and powerful type of thermostatic unit, it is particularly desirable for use in conjunction with the present invention, although other thermostatic units may be used. In the main casing of the thermostatic unit 42, a thermally expansible material of the type such as shown in and described in Patent No. 2,259,846 which issued to Sergius Vernet on October 21, 1941, is employed. The thermally expansible material is contained in the casing whereas the thermostatic element acts against a membrane or deformable member (not shown) as it expands to extend the piston of the Vernatherm upon predetermined rises in temperature and thereby axially retract the rod 38.

Thus, it is seen that applicant has provided a thermostatically controlled variable speed cooling fan drive unit for internal combustion engines or the like which at all times maintains a low speed fan drive for the cooling fan, this being desirable even when the engine is operating at a sufficiently cool condition to be efficient; and a high speed drive when such cooling capacity is required by the particular cooling system equipped with the instant invention. And due to the spring actuated clutching mechanism, an over travel safety is provided wherein extremely high temperatures of the engine coolant may cause the Vernatherm unit 42 to overtravel its normal expansion, thereby avoiding the danger of damaging any of the parts of the fan drive unit.

It will be understood that modifications and variations may be effected without departing from the scope of the novel concepts of the present invention, but it is understood that the application is to be limited only by the scope of the appended claims.

I claim as my invention:

1. In an internal combustion engine or the like, a coolant pump, a hollow shaft driving said pump, a driven pulley on said shaft, a clutch plate carried by said pulley, a stub shaft integral with said clutch plate, a fan rotatably mounted on said stub shaft and capable of sliding axially thereof into engagement with said clutch plate, a second clutch plate slidably received on said hollow shaft on the side of the fan remote from the first clutch plate, a thermostat in said pump, and means extending through the hollow shaft and actuated by said thermostat in response to temperature variations in said pump for controlling the fan speed by reciprocating said second clutch plate into engagement with said fan and clamping said fan between said first and second clutch plates for rotation with said pulley.

2. In a fan drive for internal combustion engines or the like, a hollow shaft carrying a water pump impeller on one end and a first clutch plate on the outer end axially slidable on said shaft, a second clutch plate rigidly secured to said shaft and spaced inwardly from said first clutch plate, a pulley attached to said second clutch plate and directly connected to the engine to be driven substantially at engine speed, a stub shaft integral with said second clutch plate and surrounding said hollow shaft, a fan rotatably mounted on said stub shaft and movable axially thereon, an axially movable rod within said hollow shaft, a thermostat secured to the inner end of said rod and having an actuating member engaging a pin rigidly secured to said hollow shaft, and means connected to the outer end of said rod engaging said first clutch plate and urging same into coacting relationship with said fan and second clutch plate to normally drive the fan a speed substantially lower than the pulley speed, said thermostat being responsive to a predetermined engine temperature wherein actuation thereof fully engages the clutch plates with the fan to drive same at pulley speed.

3. In a fan drive for internal combustion engines or the like, a hollow shaft carrying a water pump impeller on one end and a first clutch plate on the outer end axially slidable on said shaft, a second clutch plate rigidly secured to said shaft and spaced inwardly from said first clutch plate, a pulley attached to said second clutch plate and directly connected to the engine to be driven substantially at engine speed, a stub shaft integral with said second clutch plate and surrounding said hollow shaft, a fan rotatably mounted on said stub shaft and movable axially thereon, an axially movable rod within said hollow shaft, a thermostat secured to the inner end of said rod and having an actuating member engaging a pin rigidly secured to said hollow shaft, and resilient means maintaining the clutch plates and fan in partial engagement to effect a low speed drive, said means fully engaging the clutch plates and fan upon actuation by said thermostat and rod to effect a high speed drive.

4. In a fan drive for internal combustion engines or the like, a hollow shaft carrying a water pump impeller on one end and a first clutch plate on the outer end axially movable on said shaft, a second clutch plate rigidly secured to said shaft and spaced inwardly from said first clutch plate, a pulley attached to said second clutch plate and directly connected to the engine to be driven substantially at engine speed, a stub shaft integral with said second clutch plate and surrounding said hollow shaft, a fan rotatably mounted on said stub shaft and movable axially thereon, an axially movable rod within said hollow shaft, a thermostat secured to the inner end of said rod and having an actuating member engaging a pin rigidly secured to said hollow shaft, and a calibrated finger spring connected to the outer end of said rod, said spring normally effecting partial engagement between said clutch plates and fan for a low-speed drive and effecting total engagement between said clutch plates and fan upon actuation by said thermostat to effect a high-speed drive.

5. In a fan drive for internal combustion engines or the like, a hollow shaft carrying a water pump impeller on one end and a first clutch plate on the outer end axially movable on said shaft, a second clutch plate rigidly secured to said shaft and spaced inwardly from said first clutch plate, a pulley attached to said second clutch plate and directly connected to the engine to be driven substantially at engine speed, a stub shaft integral with said second clutch plate and surrounding said hollow shaft, a fan rotatably mounted on said stub shaft and movable axially thereon, an axially movable rod within said hollow shaft, a thermostat secured to the inner end of said rod and having an actuating member engaging a pin rigidly secured to said hollow shaft, and a calibrated finger spring connected to the outer end of said rod having a plurality of weak fingers in engagement with said first clutch plate to continuously effect partial engagement between said clutch plates and fan for a low-speed drive and a plurality of strong fingers normally out of contact with said first clutch plate, whereby a predetermined temperature in the engine actuates said thermostat axially retracting said rod and causing the heavy fingers of said spring to contact said first clutch plate and fully engage the clutch plates and fan force high-speed drive.

6. A cooling fan drive for a liquid cooled apparatus which comprises, a shaft, a pulley on said shaft, a fan, a pair of clutch plates associated with said shaft and pulley for engaging said fan therebetween, said pulley and clutch plates being mounted on said shaft for co-rotation therewith, means acting axially against one of said plates to urge it axially toward the other of said plates and against said fan for normally maintaining the clutch plates and fan in partial engagement, and a thermostatically actuated rod capable for causing said means to urge the clutch plates and fan into full driving engagement.

7. In a variable fan clutch drive, a variable speed clutch including a pair of clutch plates, one of which is shiftable axially relative the other to engage therebetween a fan, said other clutch plate being secured to a driven pulley, spring means acting on said shiftable clutch plate to normally urge said clutch plates and fan into partial engagement for driving the fan at a slow speed, a thermostat responsive to temperature, and means interconnecting said spring means and thermostat whereby a predetermined temperature increase will actuate said thermostat and cause said clutch plates and fan to fully engage thereby driving said fan at a high speed.

8. A fan drive unit which comprises a clutch having an axially stationary member and an axially movable member, a driven pulley connected to said clutch members for co-rotation therewith, a fan between and engageable by said clutch members, a multi-fingered calibrated spring member normally maintaining said movable member of said clutch partially actuated to drive the fan at relatively low speed, and a temperature responsive mechanism operatively connected to said spring and capable of causing said spring to fully actuate said movable member of clutch for driving said fan at a higher speed.

9. In a fan drive unit having a clutch, said clutch including relatively axially movable members, a driven pulley connected to said clutch members for co-rotation therewith, a fan between and engageable by said clutch members, a calibrated spring including at least one weak finger for continuously maintaining the clutch member partially coacting to drive the fan at a relatively low speed, a thermostat, and at least one strong finger actuatable by said thermostat to fully coact the clutch members and drive the fan at a higher speed.

10. A fan drive unit which comprises a rotatably mounted shaft, a driven pulley and a clutch mounted on said shaft for corotation therewith, a fan rotatably carried on said shaft in association with said clutch, a calibrated spring on said shaft normally partially actuating said clutch to drive the fan at one speed, and temperature responsive means connected to said spring and capable of causing said spring to fully actuate said clutch and drive said fan at a speed higher than said one speed.

References Cited in the file of this patent

UNITED STATES PATENTS

| | | |
|---|---|---|
| 2,005,468 | Modine | June 18, 1935 |
| 2,396,000 | Findley | Mar. 5, 1946 |
| 2,423,140 | Earley | July 1, 1947 |
| 2,438,161 | Greenlee | Mar. 23, 1948 |